Feb. 3, 1959 — J. H. WERNIG — 2,871,501
WINDSHIELD WIPER
Filed April 18, 1955 — 3 Sheets-Sheet 1

INVENTOR.
JAMES H. WERNIG
BY Craig V. Morton
HIS ATTORNEY

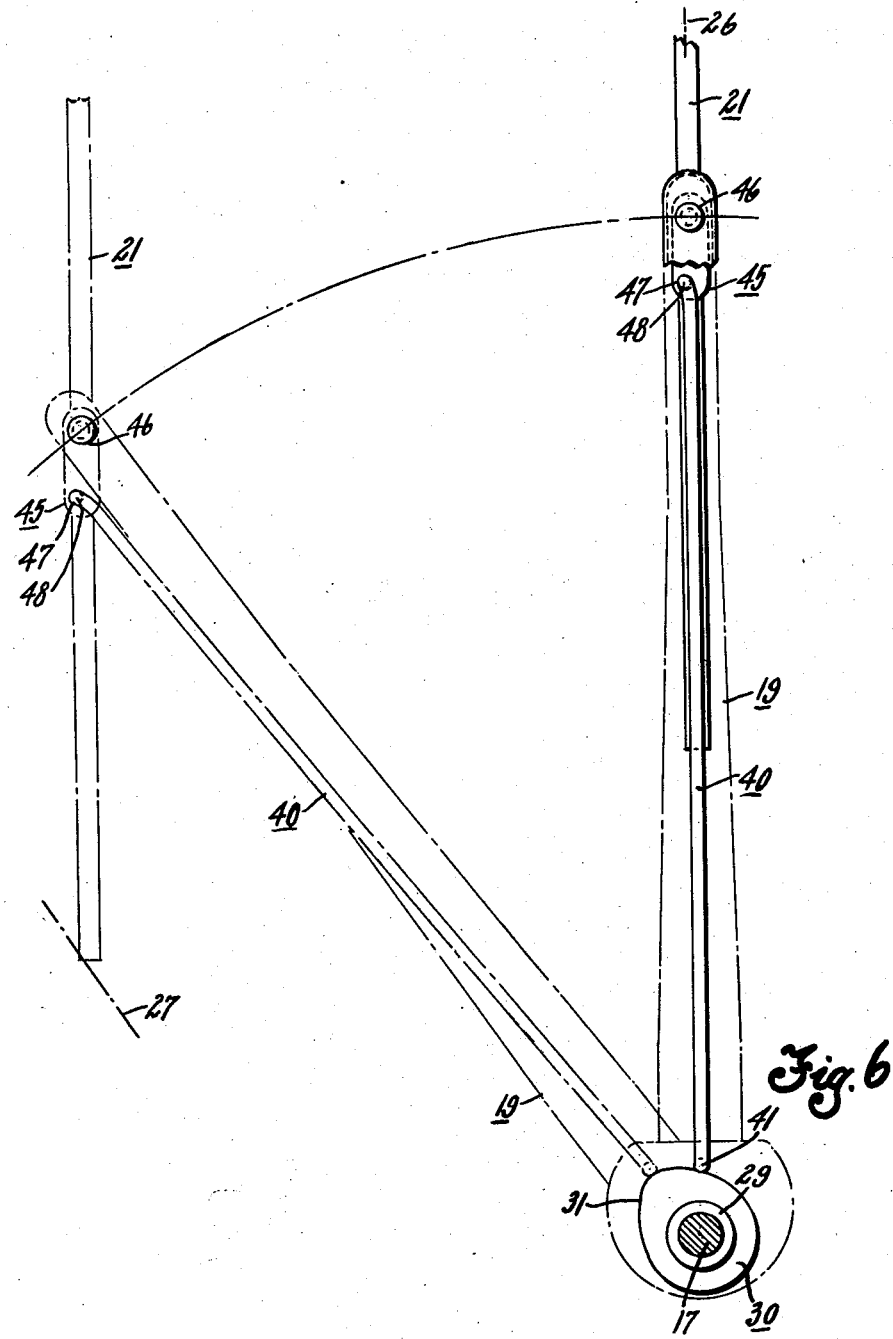

Feb. 3, 1959 J. H. WERNIG 2,871,501
WINDSHIELD WIPER
Filed April 18, 1955 3 Sheets-Sheet 3
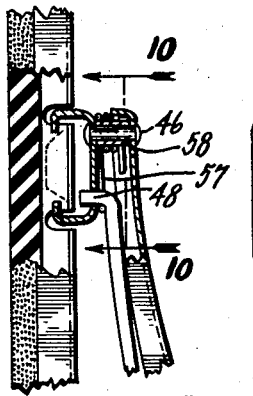
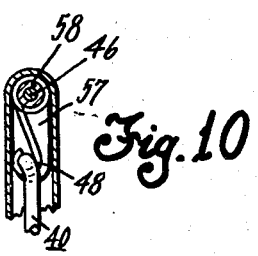
Fig.10
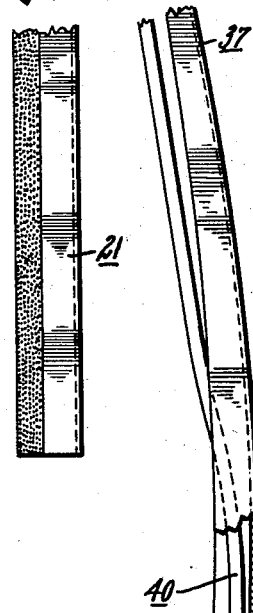
Fig.7
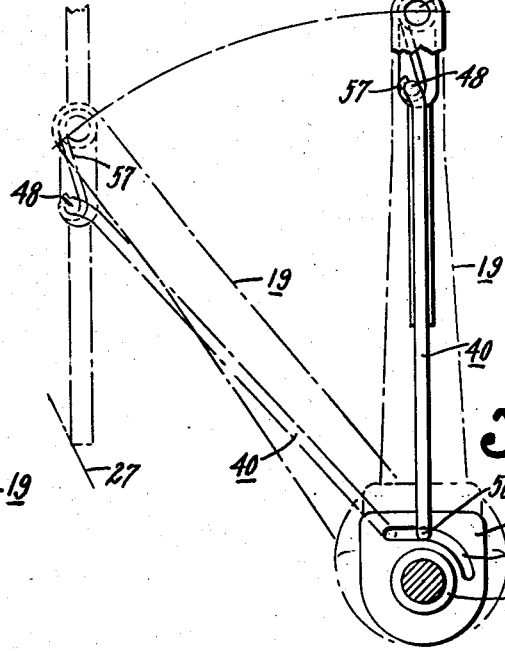
Fig.11
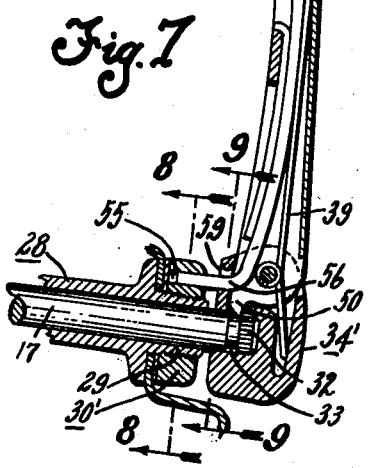
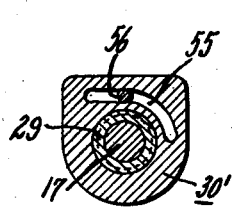
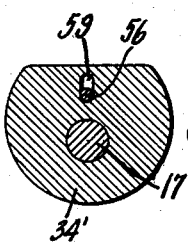
Fig.8 Fig.9
INVENTOR.
JAMES H. WERNIG
BY
Craig V. Morton
HIS ATTORNEY

United States Patent Office 2,871,501
Patented Feb. 3, 1959

2,871,501

WINDSHIELD WIPER

James H. Wernig, Birmingham, Mich., assignor to General Motors Corporation, Detroit, Mich., a corporation of Delaware Application April 18, 1955, Serial No. 501,829

2 Claims. (Cl. 15—255)

This invention pertains to the art of windshield cleaning, and particularly to a wiper construction designed for curved windshields.

The problems encountered in attempting to adequately clean sharply curved surfaces, such as wrap-around windshields, are numerous. One of the most difficult problems is to design means which will maintain the wiper blade in approximate alignment with the major axis of revolution of the curved side portions of a wrap-around windshield. In this manner, the flexible wiper blade will only have to traverse a surface of simple curvature rather than a surface of compound curvature. The present invention contemplates cam actuated means for automatically pivoting a wiper blade relative to a wiper arm during oscillation of the wiper arm so as to improve the cleaning ability of a conventional wiper blade assembly, thereby assuring engagement of the wiper blade with the windshield throughout the entire wiping stroke. Accordingly, among my objects are the provision of means operable automatically upon oscillation of a wiper arm and blade for pivoting the wiper blade relative to the arm; the further provision of a wiper arm and blade assembly including cam actuated means for pivoting the blade relative to the arm as the blade traverses the outboard portion of its stroke; and the still further provision of a windshield wiper including stationary cam means, a cam follower carried by a wiper arm and movable relative thereto, means interconnecting the cam follower and a blade pivotally carried by the arm.

The aforementioned and other objects are accomplished in the present invention by the provision of a windshield wiper including an arm having a channeled outer section within which a cam actuated rod is partially disposed and normally concealed, the outer end of the rod being pivotally connected to a wiper blade which is pivotally connected to the wiper arm. Specifically, in the preferred embodiment, an oscillatable transmission shaft is rotatably journalled in a stationary sleeve, the stationary sleeve having attached thereto a stationary cam. The outer end of the transmission shaft is formed with a conventional serrated burr which is drivingly connected with a complementary socket portion of the inner arm section. The wiper arm includes a channeled outer section which is pivotally connected to the inner section, suitable spring means being interposed between the two arm sections for applying wiping pressure to a wiper blade. In addition, the outer arm section is formed with an integral tang adapted to engage a shoulder on the burr so as to latch the wiper arm to the transmission shaft.

The wiper blade, which may be of conventional design, includes a holder to which a clip, or connector, is attached. The clip is pivotally connected to the outer end of the outer arm section. A rod, partially disposed within the channeled arm section and normally concealed thereby, has one end pivotally connected to the clip, the other end of the rod being yieldably maintained in engagement with the cam so as to constitute a cam follower. The cam is constructed so that the blade will be maintained in a substantially vertical position during the outboard portion of the wiping stroke, thereby maintaining the blade in approximate alignment with the major axis of revolution of the side portion of the wrap-around windshield.

In the preferred embodiment, the cam comprises a slot and the cam follower comprises a tang portion of the rod. In addition, the outer end of the rod is interconnected by a torsion spring to the outer arm section, the torsion spring normally tending to yieldingly maintain the wiper blade in alignment with the arm. In this embodiment, the cam slot is formed so that the blade changes its attitude relative to the arm during the outboard portion of its stroke.

Further objects and advantages of the present invention will be apparent from the following description, reference being had to the accompanying drawings wherein a preferred embodiment of the present invention is clearly shown.

In the drawings:

Figure 6 is a schematic drawing of the operation of the wiper of this invention;

Figure 7 is a fragmentary view, partly in section and partly in elevation, of the preferred embodiment of the wiper of this invention;

Figures 8, 9 and 10 are sectional views taken along lines 8—8, 9—9 and 10—10, respectively, of Figure 7; and Figure 11 is a schematic drawing depicting the operation of the wiper of Figure 7.

Figure 1:
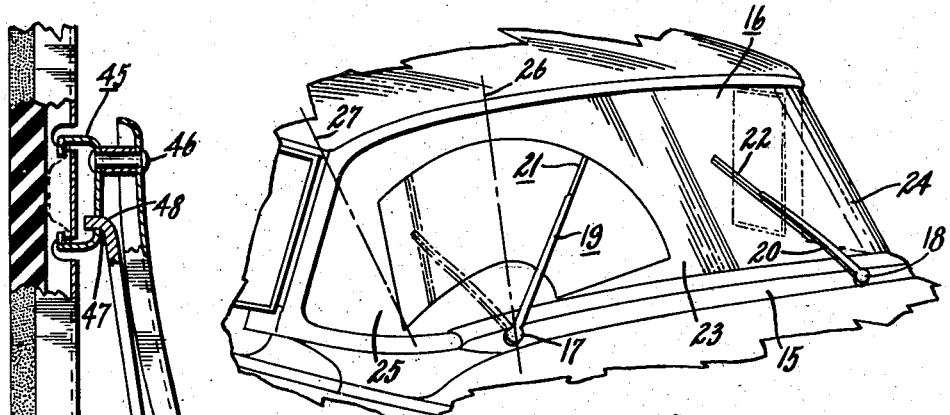
Figure 1 is a fragmentary view, in elevation, of a vehicle equipped with the windshield wiper of this invention.
Figures 4, 5:
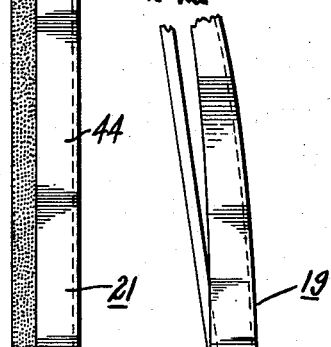
Figure 4 is a side view, in elevation, of the blade connector, or clip.
Figure 5 is a plan view, in elevation, of the blade clip.

With particular reference to Fig. 1, the windshield cleaning mechanism of this invention is shown in combination with a vehicle having a cowl 15 and a wrap-around windshield generally depicted by the numeral 16. The wiping apparatus includes a pair of spaced shafts, or oscillatable transmission shafts, 17 and 18, to which wiper arms 19 and 20 are detachably connected. The wiper arms, which will be described in detail hereinafter, carry wiper blades 21 and 22, which may be of conventional design so as to readily conform to curved surfaces. The wrap-around windshield includes a front portion 23 and side portions 24 and 25 which are located in substantially parallel, spaced vertical planes on opposite sides of the vehicle. Accordingly, the portion of the windshield located between lines 26 and 27 between the front and side portions, is curved.

In the present invention, the wiper blades 21 and 22 are automatically pivoted relative to their arms 19 and 20 during the outboard portion of the wiping stroke depicted between lines 26 and 27. In particular, the wiper blades 21 and 22 are maintained in a substantially vertical position during the outboard portion of their strokes, in which position the blades are in approximate alignment with the major axis of revolution of the sharply curved portions of the windshield. Stated in other words, between the lines 26 and 27 as depicted in Fig. 1, the attitude of the wiper blades is continuously and automatically adjusted so as to assure engagement between the blades and the surface of the windshield whereby adequate cleaning of the windshield will be achieved.

With particular reference to Figs. 2 through 6, one embodiment of the improved wiper will be described, only one of the wipers being described in detail since they are of identical construction. The transmission shaft 17 is rotatably journalled in a stationary sleeve bushing 28 which includes an externally threaded portion 29 that projects through an opening in the vehicle cowl 15. A nut 30 having a cam, or eccentric surface, 31 as seen particularly in Fig. 6, is received by the threaded portion 29, both the bushing 28 and the nut 30 being stationary. The outer end of the shaft 17 is formed with a conventional serrated burr 32, an annular groove 33 being formed on the shaft 17 for a purpose to be described hereinafter. The wiper arm 19 includes an inner section 34 having a serrated socket 35 which is received by the burr 32 so as to drivingly connect the arm and the shaft 17. The inner section 34 also includes a radially extending, bifurcated portion 36 to which the outer section 37 of the arm is pivotally connected by means of a pin 38. The outer section 37 is biased towards the windshield by a torsion spring 39 carried by pin 38 and having portions engaging the inner and outer sections. The arm section 37 includes a pair of spaced tangs 49 and 50 which are received in the groove 33 and engage the underside of burr 32 so as to latch the arm to the burr.

Figures 2, 3:
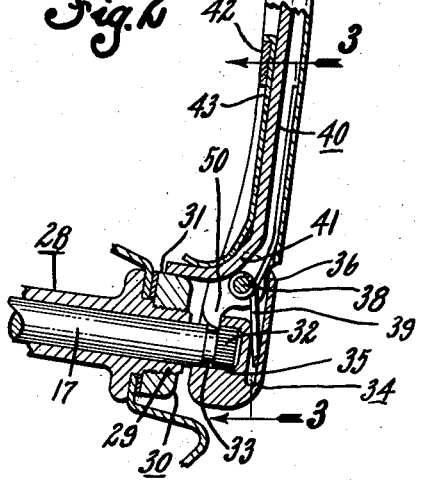
Figure 2 is a fragmentary view, partly in elevation and partly in section, depicting the preferred embodiment of the wiper of this invention.
Figure 3 is a sectional view taken along line 3—3 of Figure 2.

As seen in Figs. 2 and 3, the outer arm section 37 is of channel shape. A reciprocable rod 40 is partially disposed within the channeled section 37 and normally concealed thereby from exposure to the elements. The inner end of the rod 40 is bent inwardly at 41 and engages the eccentric surface 31 of the nut 30, thereby constituting a cam follower. The channeled outer section 37 is formed with an integral web 42 to which one end of a leaf spring 43 is securely fastened by any suitable means, such as a weld. The free end of the leaf spring 43 engages the inwardly bent portion 41 of the rod 40 and maintains the end portion of the rod 40 in engagement with the eccentric surface 31.

The wiper blade 21, which, as alluded to hereinbefore, may be of conventional flexible design, includes a channeled holder 44 to which a blade clip 45 is attached. The blade clip 45 is pivotally connected to the outer end of the arm section 37 by means of a rivet 46. In addition, the clip 45 is apertured at 47, and receives an inwardly directed tang portion 48 of the rod 40. Thus, the clip 45 is both pivotally connected to the arm 19 and the rod 40.

Operation of the preferred wiper assembly is schematically shown in Fig. 6. During oscillation of the wiper arm and blade from the park position adjacent the cowl to the vertical position depicted by line 26 in Fig. 1, the blade 21 remains aligned with the arm 19. In other words, during the inboard portion of the wiping stroke between the cowl and line 26 in Fig. 1, the attitude of the blade 21 does not change. This result is accomplished since a portion of the cam surface 31 is concentric with respect to the shaft 17. However, during movement of the blade and arm in the outboard portion of its stroke between lines 26 and 27 in Fig. 1, the attitude of the blade 21 is varied so as to maintain the blade 21 in a substantially vertical position, as depicted in Fig. 6. Thus, during movement of the blade and arm assembly between lines 26 and 27 of Figs. 1 and 6, the eccentric surface 31 imparts outward movement to the rod 40 which results in clockwise pivotal movement of the blade 21 relative to the arm 19, as viewed in Fig. 6. Conversely, during movement of the blade and arm assembly from line 27 to line 26, the rod 40 moves inwardly, thereby pivoting the blade 21 in a counter-clockwise direction relative to the arm 19, as viewed in Fig. 6. This continuous adjustment of the blade attitude results in effective cleaning of the curved portion of the wrap-around windshield by assuring proper wiping contact between the wiper blade and the windshield surface.

In order to detach the wiper arm 19 from the transmission shaft 17, the outer section 37 of the wiper arm must be pivoted outwardly in a clockwise direction, as viewed in Fig. 2 relative to the inner section 34. In this manner, the tangs 49 and 50 will be removed from the annular groove 33 whereupon the latch means constituted thereby will be released. Consequently, the arm 19 may be removed from the burr 32 by pulling the inner section 34 outwardly.

With reference to Figs. 7 through 10, the preferred embodiment of the wiper assembly of this invention will be described, similar numerals depicting similar parts as described in the preferred assembly. Thus, as seen in Fig. 7, the threaded portion 29 of the bushing 28 receives a nut 30' having a cam slot 55 including concentric and eccentric portions. The rod 40 includes an inwardly bent tang portion 56 which is received by the slot 55. In addition, the outer arm section 37 and the outer tang 48 of the rod 40 are interconnected by a torsion spring 57, the intermediate convolutions of which encompass a tubular portion 58 of the arm section 37 through which the rivet 46 extends. One end of the torsion spring 57 engages the arm section 37, and the other end is hooked around the tang 48. The torsion spring 57 normally tends to maintain the blade 21 in alignment with the arm 19. However, as depicted in Fig. 11, during movement of the arm and blade between lines 26 and 27 the attitude of the blade 21 is continuously adjusted in a manner identical with that hereinbefore described into preferred embodiment. The rod 40 also extends through an aperture 59 in the inner arm section 34', as shown in Figs. 7 and 9.

From the foregoing, it is apparent that the present invention results in a wiper assembly which is operable to adequately clean substantial portions of wrap-around windshields. Moreover, the improved cleaning ability of the instant wiper is achieved with a relatively few additional parts, and most of the operating parts are concealed by the wiper arm from exposure to the elements.

While the embodiment of the present invention as herein disclosed constitutes a preferred form, it is to be understood that other forms might be adopted.

What is claimed is as follows:

1. Apparatus for wiping a windshield having curved wrap-around portions at the outer sides thereof, including, an oscillatable wiper shaft, a stationary bushing rotatably supporting said shaft, a wiper arm comprising an inner section drivingly connected to said shaft, an outer section, means pivotally interconnecting said outer section and said inner section, and spring means carried by said arm and engaging said sections for applying wiping pressure to the outer section, a wiper blade, a clip attached to said wiper blade and pivotally connected to the outer section of said arm, a cam member attached to said bushing having a slot with portions concentric and eccentric with respect to said shaft, a reciprocable rod disposed beneath said arm, said rod being actuated by said cam member and having an operative connection with said clip for adjusting the attitude of said blade relative to said arm during a portion of its wiping stroke, the operative connection between said rod and said clip comprising a hooked end of said rod which extends through an aperture in said clip, and a torsion spring interconnecting said rod and said outer arm section for normally yieldingly maintaining said blade in alignment with said arm.

2. Apparatus of the character set forth in claim 1 wherein said reciprocable rod has a second hooked end disposed within the slot of said cam member so as to be actuated during oscillation of said wiper arm.

References Cited in the file of this patent

UNITED STATES PATENTS

| | | |
|---|---|---|
| 2,079,399 | Drew et al. | May 4, 1937 |
| 2,295,620 | Zaiger | Sept. 15, 1942 |
| 2,356,424 | Paton | Aug. 22, 1944 |

FOREIGN PATENTS

| | | |
|---|---|---|
| 1,099,262 | France | Mar. 16, 1955 |